United States Patent [19]

Lane, Jr. et al.

[11] 4,337,621
[45] Jul. 6, 1982

[54] POWER ELEMENT ASSEMBLY

[75] Inventors: Ernest Lane, Jr.; Raymond E. Seekins, both of Lockport, N.Y.

[73] Assignee: General Motors Corporation, Detroit, Mich.

[21] Appl. No.: 170,745

[22] Filed: Jul. 21, 1980

[51] Int. Cl.³ .............................................. F01B 29/10
[52] U.S. Cl. ..................................... 60/527; 236/100; 251/11; 337/315
[58] Field of Search ................ 60/527, 528, 530, 531; 73/368.3; 251/11; 277/213, 214, 215; 236/99 K, 100; 337/315; 92/102, 105, 168

[56] References Cited

U.S. PATENT DOCUMENTS

| | | | |
|---|---|---|---|
| 2,881,616 | 4/1959 | Clifford et al. | 73/363 |
| 2,907,210 | 10/1959 | Riedel | 73/368.3 |
| 3,016,748 | 1/1962 | Vernet | 73/368.3 |
| 3,046,787 | 7/1962 | Wagner | 73/368.3 |
| 3,080,756 | 3/1963 | Baker | 73/368.3 |
| 3,149,455 | 9/1964 | Daly et al. | 60/23 |
| 3,153,933 | 10/1964 | Freismuth et al. | 73/368.3 |
| 3,308,668 | 3/1967 | Wong | 73/368.3 |
| 3,336,745 | 8/1967 | Schwartz | 60/23 |
| 3,420,105 | 1/1969 | Winter | 73/368.3 |

FOREIGN PATENT DOCUMENTS 1275855  5/1972  United Kingdom .

*Primary Examiner*—Allen M. Ostrager
*Assistant Examiner*—Stephen F. Husar
*Attorney, Agent, or Firm*—R. L. Phillips

[57] ABSTRACT

A power element assembly is disclosed for use in a liquid environment to operate devices such as valves, switches and the like wherein such assembly is provided with an elastomeric diaphragm having an integral sealing neck with internal seal beads that are sealingly retained in engagement with a piston by prescribed compression of the sealing neck at assembly.

3 Claims, 4 Drawing Figures

POWER ELEMENT ASSEMBLY

This invention relates to power element assemblies used in a liquid environment to operate devices such as valves, switches and the like, and more particularly to the sealing arrangement therein.

In a typical power element assembly such as is presently used in vehicle cooling system thermostats, a rubber O-ring and steel back-up washer are joined with a brass flange seal to form a subassembly. This subassembly is then assembled to a brass cup and wax assembly, a rubber diaphragm, an anti-extrusion Teflon washer and a piston to form the complete power element assembly. In such an assembly, the O-ring prevents the liquid surrounding the power element assembly from entering the diaphragm piston pocket while the anti-extrusion washer prevents extrusion of the O-ring into the opening in the flange seal through which the piston extends. In attempting to simplify such a sealing arrangement it has been proposed, for example, to form an internal ridge in the diaphragm in the piston pocket of the diaphragm having a cylindrical surface which has an interference fit with the piston. However, it has been found that it is then difficult to provide uniform piston contact for durability under cyclic conditions while minimizing friction between the piston and the piston pocket to prevent piston seizing.

The present invention is directed to an improved power element assembly and particularly as to the sealing arrangement therein. According to the present invention, a sealing neck extending about the piston is formed integral with and on the outboard side of the diaphragm. The counterbore in the flange seal normally accommodating the O-ring, back-up washer and anti-extrusion washer as in the first aforementioned type is then sized so as to fully accommodate the sealing neck without the O-ring seal and back-up washer. For sealing, the sealing neck is provided with radially spaced outer and inner peripheral surfaces. The inner peripheral surface has a plurality of axially spaced and radially inwardly projecting annular seal beads of rounded cross-section. On the other hand, the outer peripheral surface has a concave cross-section prior to assembly. The annular seal beads have an interference fit with respect to the piston while the end diameter and depth of concavity of the outer peripheral surface prior to assembly of the piston and diaphragm are determined so that the sealing neck is deformed radially outward midlength thereof on piston and diaphragm assembly. The outer peripheral surface of the sealing neck at assembly is thus caused to conform to and sealingly engage with the counterbore in the flange seal while the annular seal beads retain their separate identity while being elastically retained in sealing engagement with the piston by the compression of the sealing neck in the counterbore. The thus loaded sealing neck retains such tight sealing with uniform compression of the seal beads on the piston under both static and dynamic conditions of the piston. Moreover, there is provided a radius between the seal beads to reduce the compression forces required for maximum sealing. This latter feature minimizes the friction between the piston and the rubber diaphragm to prevent piston seizing.

Thus the simple rubber diaphragm with integral sealing neck of the present invention not only effectively performs the function of the separate O-ring previously used (thereby eliminating same and its back-up washer), it also provides improved sealing by its plural seal beads with a minimum of friction at the piston. On the other hand, the antiextrusion washer is still utilized to prevent rubber extrusion into the flange seal during piston travel. Thus the power element assembly has been substantially simplified to ease the manufacture and reduce the cost thereof while the necessary functions have not only been retained but improved upon.

These and other objects, advantages and features of the present invention will be more apparent from the following description and drawing in which.

Figure 1:
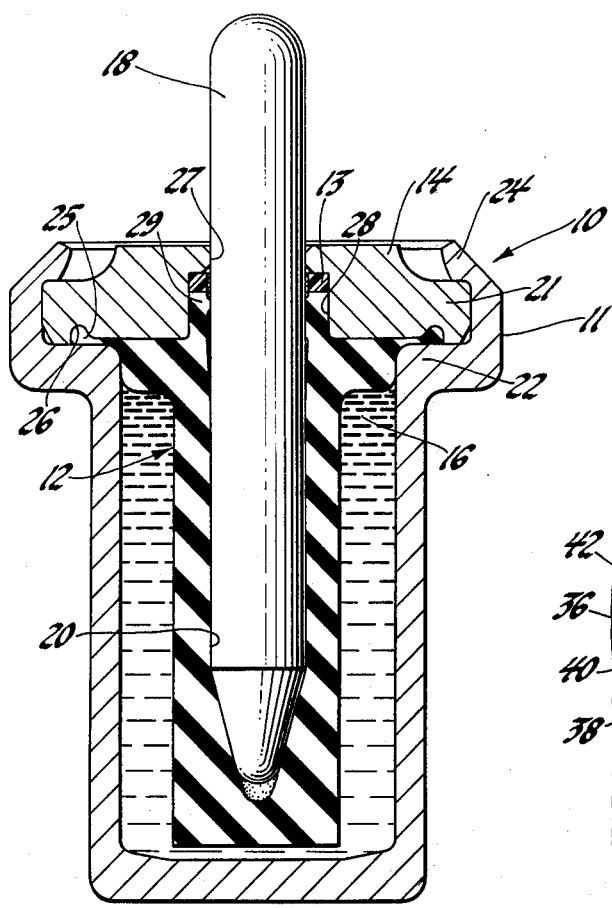
FIG. 1 is a cross-sectional view of a power element assembly constructed according to the present invention.

Referring to the drawing, there is shown a power element assembly 10 constructed according to the present invention, such power element assembly being adapted for use in a liquid environment to operate devices such as valves, switches and the like in response to temperature change of the surrounding medium, (that shown being particularly adapted to operate a vehicle cooling system thermostat). The power element assembly basically comprises a brass cylindrical cup 11, a rubber diaphragm 12, a Teflon anti-extrusion washer 13, a brass flange seal 14, a thermally expansible material (wax) 16 and a steel cylindrical piston 18. The wax 16 is located in the cup 11 about a central cylindrical piston pocket 20 formed integral with the diaphragm 12. The diaphragm 12 is clamped along its outer periphery 21 to a radially extending annular shoulder 22 on the cup 11 by the flange seal 14 by crimping the rim 24 of the cup over the outer periphery of the flange seal. During such clamping, an annular bead 25 is extruded from the outboard side of the diaphragm 12 into an annular groove 26 in the opposing side of the flange seal 14 to effect tight sealing at this joint. This piston 18 is received in the central pocket 20 of the diaphragm and extends through a central opening 27 in the flange seal 14 and is displaced outwardly by thermal expansion of the wax. The anti-extrusion washer 13 is received about the piston 18 in a counterbore 28 in the inboard side of the flange seal and operates to prevent extrusion of the diaphragm into the opening 27 of the flange seal during outward piston travel.

Figure 2:
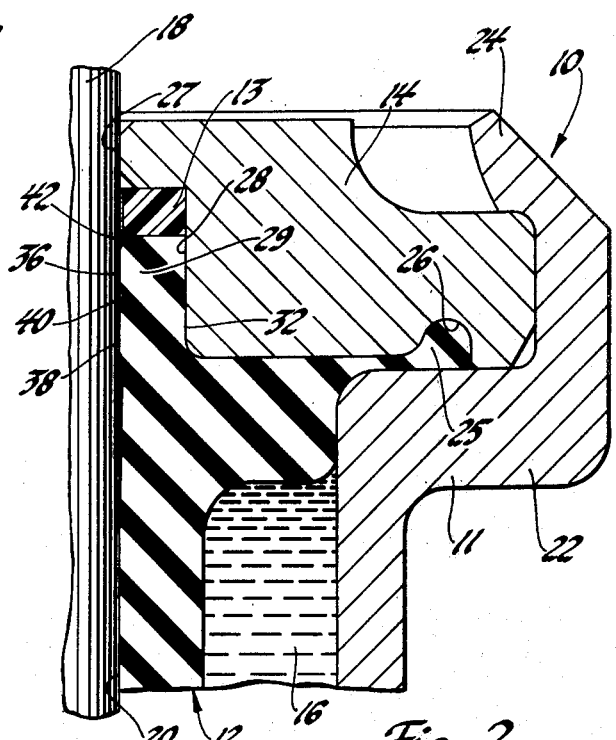
FIG. 2 is an enlarged view of a portion of FIG. 1.
Figure 3:
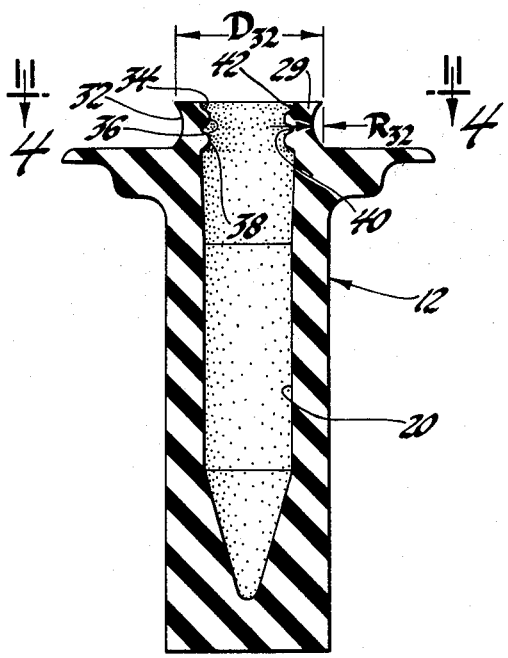
FIG. 3 is a view of the diaphragm of FIG. 1 prior to assembly.
Figure 4:
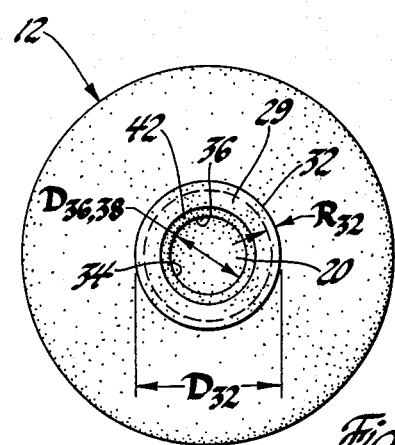
FIG. 4 is a view taken along the line 4—4 of FIG. 3.

In such a power element assembly, it is essential that the surrounding liquid be prevented from entering past the piston 18 into the diaphragm's piston cavity 20 yet the diaphragm must still have uniform piston contact for durability under cyclic conditions. Heretofore, it has been common practice to utilize a separate O-ring as the seal. It has also been proposed to use some form of internal ridge of extensive surface having an interference fit with the piston. The present invention departs therefrom in meeting such design objectives by the formation of a sealing neck 29 integral with the outboard side of the diaphragm 12 at the entrance to the piston cavity 20 therein. The counterbore 28 in the flange seal 14 is then extended axially so that it can fully accommodate the sealing neck 29 where it projects past what would normally be the opening to the piston cavity. As shown in FIGS. 3 and 4, the sealing neck 29 of the diaphragm 12 prior to assembly has very differently shaped radially spaced outer and inner pripheral surfaces 32 and 34. The inner peripheral surface 34 is formed with a pair of axially spaced and radially inwardly projecting annular seal beads 36 and 38 of rounded cross-section located midway the ends of the sealing neck. On the other hand, the outer peripheral surface 32 is provided with a concave shape or cross-section prior to assembly. The annular seal beads 36 and 38 at their crest diameter $D_{36, 38}$ have a predetermined interference fit with respect to the piston 18 while the end diameter $D_{32}$ and the radial depth $R_{32}$ of the outer peripheral surface 32 prior to assembly of the piston and diaphragm is determined so that the sealing neck is deformed radially outward midlength thereof such that the outer peripheral surface 32 is caused to conform to and sealingly engage with the cylindrical surface of the counterbore 28 while the annular seal beads 36, 38 retain their separate identity while being elastically retained in sealing engagement with the piston by compression of the sealing neck in the counterbore in the flange seal during assembly of the piston and the diaphragm (see FIGS. 1 and 2). Thereafter, the thus loaded sealing neck retains such tight sealing with uniform compression of the seal beads on the piston under both static and dynamic conditions of the piston. Moreover, there is provided a radius 40 at the valley between the seal beads 36 and 38 which acts to reduce the compression forces required for their maximum sealing. This latter feature minimizes the friction between the piston and the rubber diaphragm to prevent piston seizing. In addition, there is provided a radius 42 at the entrance to the sealing neck 29 which provides clearance and ease of piston entrance during inward piston travel. As before, the anti-extrusion washer 13 operates to prevent extrusion of the diaphragm, in this case the sealing neck 29, into the flange seal opening 27 during power element function.

The above-described preferred embodiment is illustrative of the invention which may be modified within the scope of the appended claims.

The embodiments of the invention in which an exclusive property or privilege is claimed are defined as follows:

1. In a power element assembly for use in a liquid environment to operate devices such as valves, switches and the like wherein the assembly is of the type having a cup, an elastomeric diaphragm, a flange seal sealingly clamping the diaphragm to the cup so that the diaphragm and cup cooperatively retain a thermally expansible material extending about a central piston pocket in the diaphragm, a piston received in the pocket in the diaphragm and extending through a central opening in the flange seal and displaced outwardly by thermal expansion of the expansible material, and a rigid annular member received about the piston in an annular recess in the flange seal for preventing extrusion of the diaphragm into the opening in the flange seal: the improvement comprising in combination, a sealing neck formed integral with the diaphragm and extending about the piston, the recess in the flange seal having an inner peripheral surface sized so that the recess can fully accommodate said sealing neck, said sealing neck having radially spaced outer and inner peripheral surfaces, said inner peripheral surface having a plurality of axially spaced and radially inwardly projecting annular seal beads, said outer peripheral surface having a concave cross-section prior to assembly, and said annular seal beads having a predetermined interference fit with respect to the piston and the end dimension and the depth of concavity of said outer peripheral surface prior to assembly of the piston and diaphragm being determined so that said sealing neck is deformed radially outward midlength thereof and said outer peripheral surface is caused to conform to and sealingly engage with said inner peripheral surface of said recess while said annular seal beads retain their separate identity while being sealingly retained in engagement with the piston by compression of said sealing neck in the recess in the flange seal during assembly of the piston and diaphragm and thereafter under both static and dynamic conditions of the piston.

2. In a power element assembly for use in a liquid environment to operate devices such as valves, switches and the like wherein the assembly is of the type having a cup, an elastomeric diaphragm, a flange seal sealingly clamping the diaphragm to the cup so that the diaphragm and cup cooperatively retain a thermally expansible material extending about a central piston pocket in the diaphragm, a piston received in the diaphragm and extending through a central opening in the flange seal and displaced outwardly by thermal expansion of the expansible material, and a rigid annular member received about the piston in an annular recess in the flange seal for preventing extrusion of the diaphragm into the opening in the flange seal: the improvement comprising in combination, a sealing neck formed integral with an outboard side of the diaphragm and extending about the piston, the recess in the flange seal having an inner peripheral surface sized so that the recess can fully accommodate said sealing neck, said sealing neck having radially spaced outer and inner peripheral surfaces, said inner peripheral surface having a plurality of axially spaced and radially inwardly projecting annular seal beads of rounded cross-section, said outer peripheral surface having a concave cross-section prior to assembly, and said annular seal beads having a predetermined interference fit with respect to the piston and the end dimension and the depth of concavity of said outer peripheral surface prior to assembly of the piston and diaphragm being determined so that said sealing neck is deformed radially outward midlength thereof and said outer peripheral surface is caused to conform to and sealingly engage with said inner peripheral surface of said recess while said annular seal beads retain their separate identity while being sealingly retained in engagement with the piston by compression of said sealing neck in the recess in the flange seal during assembly of the piston and diaphragm and thereafter under both static and dynamic conditions of the piston.

3. In a power element assembly for use in a liquid environment to operate devices such as valves, switches and the like wherein the assembly is of the type having a cup, an elastomeric diaphragm, a flange seal sealingly clamping the diaphragm to the cup to that the diaphragm and cup cooperatively retain a thermally expansible material extending about a central piston pocket in the diaphragm, a piston received in the pocket in the diaphragm and extending through a central opening in the flange seal and displaced outwardly by thermal expansion of the expansible material, and a rigid annular member received about the piston in an annular recess in the flange seal for preventing extrusion of the diaphragm into the opening in the flange seal: the improvement comprising in combination, a sealing neck formed integral with an outboard side of the diaphragm and extending about the piston, the recess in the flange seal having an inner peripheral surface sized so that the recess can fully accommodate said sealing neck, said sealing neck having radially spaced outer and inner peripheral surfaces, said inner peripheral surface having a rounded entrance edge and a pair of axially spaced and radially inwardly projecting annular seal beads of rounded cross-section with a rounded valley therebetween, said outer peripheral surface having a concave cross-section prior to assembly, and said annular seal beads having a predetermined interference fit with respect to the piston and the end dimension and the depth of concavity of said outer peripheral surface prior to assembly of the piston and diaphragm being determined so that said sealing neck is deformed radially outward midlength thereof and said outer peripheral surface is caused to conform to and sealingly engage with said inner peripheral surface of said recess while said annular seal beads retain their separate identity while being sealingly retained in engagement with the piston by compression of said sealing neck in the recess in the flange seal during assembly of the piston and diaphragm and thereafter under both static and dynamic conditions of the piston.

* * * * *

UNITED STATES PATENT AND TRADEMARK OFFICE
CERTIFICATE OF CORRECTION

PATENT NO. : 4,337,621
DATED : July 6, 1982
INVENTOR(S) : Ernest Lane, Jr. et al It is certified that error appears in the above—identified patent and that said Letters Patent is hereby corrected as shown below:

Column 4, line 54, "to" (second occurrence) should read -- so --.

Signed and Sealed this

Seventh Day of September 1982

[SEAL]

Attest:

GERALD J. MOSSINGHOFF

Attesting Officer  Commissioner of Patents and Trademarks